United States Patent
Ito et al.

(10) Patent No.: US 6,583,570 B1
(45) Date of Patent: *Jun. 24, 2003

(54) DISCHARGE LAMP DEVICE FOR VEHICLE

(75) Inventors: Masayasu Ito, Shizuoka (JP); Hiroshi Takeda, Shizuoka (JP); Shuji Matsuura, Shizuoka (JP); Akihiro Mochizuki, Shizuoka (JP); Hiroki Ishibashi, Shizuoka (JP); Akihiro Matsumoto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/651,904

(22) Filed: Aug. 30, 2000

(30) Foreign Application Priority Data

Sep. 10, 1999 (JP) ............................. 11-257468

(51) Int. Cl.$^7$ ................................. B60Q 1/02
(52) U.S. Cl. ................... 315/82; 315/291; 315/307; 307/10.8
(58) Field of Search ................... 315/82, 77, 224, 315/291, 294, DIG. 7, 307, 308; 307/10.8

(56) References Cited

U.S. PATENT DOCUMENTS

| | | | |
|---|---|---|---|
| 5,142,203 A | | 8/1992 | Oda et al. ............ 315/308 |
| 5,191,266 A | * | 3/1993 | Futami et al. ............ 315/307 |
| 5,212,428 A | * | 5/1993 | Sasaki et al. ............ 315/308 |
| 5,270,620 A | * | 12/1993 | Basch et al. ............ 315/291 |
| 5,449,973 A | | 9/1995 | Yamashita et al. ............ 315/82 |
| 5,572,094 A | | 11/1996 | Yamashita et al. ............ 315/308 |
| 5,900,698 A | | 5/1999 | Fast ............ 315/82 |

FOREIGN PATENT DOCUMENTS

| | | | |
|---|---|---|---|
| DE | 4020878 A1 | 1/1991 | ............ B60Q/1/14 |
| DE | 19632190 | 8/1996 | |
| EP | 0596806 A1 | 11/1993 | |

* cited by examiner

Primary Examiner—Don Wong
Assistant Examiner—Ephrem Alemu
(74) Attorney, Agent, or Firm—Fish & Richardson P.C.

(57) ABSTRACT

A discharge lamp device for a vehicle includes a lighting circuit for performing lighting controls of a discharge lamp for high beam and a discharge lamp for low beam, both lamps having the same rating. The lighting circuit controls the power supply such that the electrical power input when the discharge lamp for high beam is lighted is greater than the electrical power input when the discharge lamp for low beam is lighted.

20 Claims, 8 Drawing Sheets

DISCHARGE LAMP DEVICE FOR VEHICLE

BACKGROUND OF THE INVENTION

1. Field of the Invention

The present invention relates to a technology for reducing a starting time of the discharge lamp for high beam.

2. Background of the Invention

A known lighting circuit of a discharge lamp(e.g. a metal halide lamp)for a vehicle comprises a DC power circuit, a DC-to-AC converter, and a starting circuit (a starter circuit).

If a plurality of discharge lamps is used as a light source for a vehicle, a means for controlling the lamps is required. For example, when a discharge lamp is used as a front light of an automobile, and a high beam and a low beam are separately provided by an individual discharge lamp(so-called, four-lamp lighting), a pair of discharge lamps is required on the right and the left sides of the vehicle. Each pair of the discharge lamps requires a lighting circuit for controlling the lamp.

However, if a discharge lamp for high beam and a discharge lamp for low beam in a conventional device have the same power rating, meaning both discharge lamps are lighted with the same electrical power, the discharge lamp for high beam may not be able to attain a luminosity required for a condition that momentarily requires a certain amount of brightness. For example, the condition may be signaling to pass by turning the headlights on and off (on/off).

An object of the invention is to secure a quantity of illuminating light necessary for a vehicle by momentarily raising the luminous flux of the discharge lamp for high beam.

SUMMARY OF THE INVENTION

A discharge lamp device for a vehicle according to an implementation of the invention comprises a discharge lamp for high beam, a discharge lamp for low beam, both having the same power rating, and a lighting circuit for controlling those lamps. The lighting circuit controls the lamps in such a way that in lighting the lamps, the electrical power supplied for lighting the discharge lamp for high beam is made greater than the electrical power supplied for lighting the discharge lamp for low beam.

Therefore, according to an implementation of the invention, by controlling the electrical power for lighting the discharge lamp for high beam to be greater than the electrical power for lighting the discharge lamp for low beam, the implementation achieves to raise momentarily the luminous flux of the discharge lamp for high beam.

DETAILED DESCRIPTION OF THE PREFERRED EMBODIMENTS

Controlling power supplied to the discharge lamp will be described with reference to FIG. 1.

Figure 1:
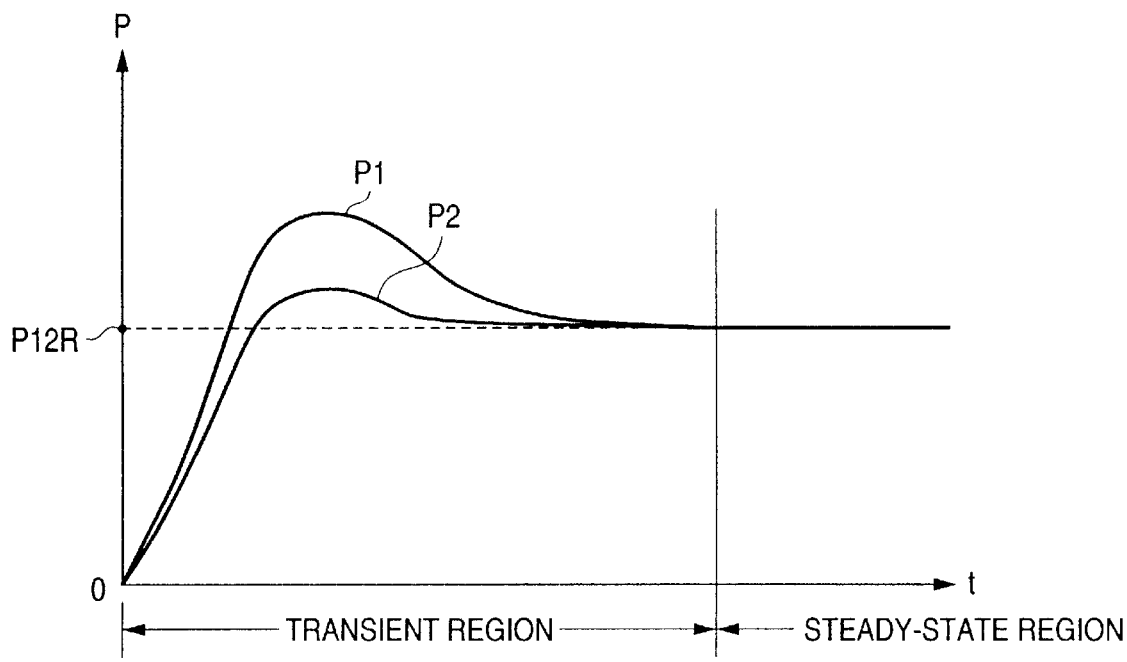
FIG. 1 shows graphically an operation of a discharge lamp device for a vehicle according to an implementation of the invention.

FIG. 1 shows schematically a temporal change of electrical power of the discharge lamp, in which the abscissa indicates time "t" and the ordinate indicates electrical power "P" supplied to the discharge lamp. Curves "P1" and "P2" shown in FIG. 1 respectively express the temporal change of value of the electrical power respectively supplied to the two discharge lamps. Further, "P12R" in parallel with the time axis expresses a rated power value of the discharge lamp.

P1 shows the electrical power supplied to the discharge lamp for high beam, and P2 shows the electrical power supplied to the discharge lamp for low beam.

For the luminous flux to reach a steady-state value as soon as possible, the discharge lamp is controlled generally in such a manner that the electrical power greater than the rated electrical power is provided from the start to reach the steady lighting state quickly. For this to occur, the electrical power must be controlled in proper quantities.

In an example shown in FIG. 1, the two discharge lamps are controlled in the initial period(hereinafter referred to as the "transient region") in such a manner that the discharge lamp is lighted by supplying an electrical power exceeding a rated value to raise the luminous flux quickly. Thereafter, the lamps go into a steady lighting state (hereinafter referred to as the "steady-state region"), during which the power is controlled to a constant value.

In an implementation of the invention, a supply of electrical power is so controlled that the supplied electrical power when the discharge lamp for high beam is lighted is greater than the supplied electrical power when the discharge lamp for low beam is lighted. The power is controlled so that the relation P1>P2 is satisfied in the transient region. Thus, the luminous flux of the discharge lamp for high beam can be quickly raised. Therefore, a time lag in lighting the discharge lamp during a passing operation as well as any operational problems associated with the time lag can be reduced.

Further, to satisfy the relation P1>P2, the electrical power supplied to the discharge lamp for low beam is controlled to be the same as or lower than rated electrical power value. That is, to satisfy the relation P1>P2, P2 may be kept the same and only the P1 may be made large, or P1 may be made large and P2 may be made small. The latter condition is advantageous in that, for example, when the discharge lamp for high beam is switched on in a state where the discharge lamp for low beam is being lighted, a load applied on the lighting circuit can be reduced.

The graph curves shown in FIG. 1 represent a case that lighting of the two discharge lamps is simultaneously started at t=0, or that the lighting start time of each discharge lamp is set to the starting point t=0. In the former situation, since the light distribution for high beam should be considered first in a state where the both discharge lamps are switched on, the starting time of the discharge lamp for high beam can be reduced by making the electrical power supplied to the discharge lamp for high beam greater than the electrical power supplied to the discharge lamp for low beam.

Figure 2:
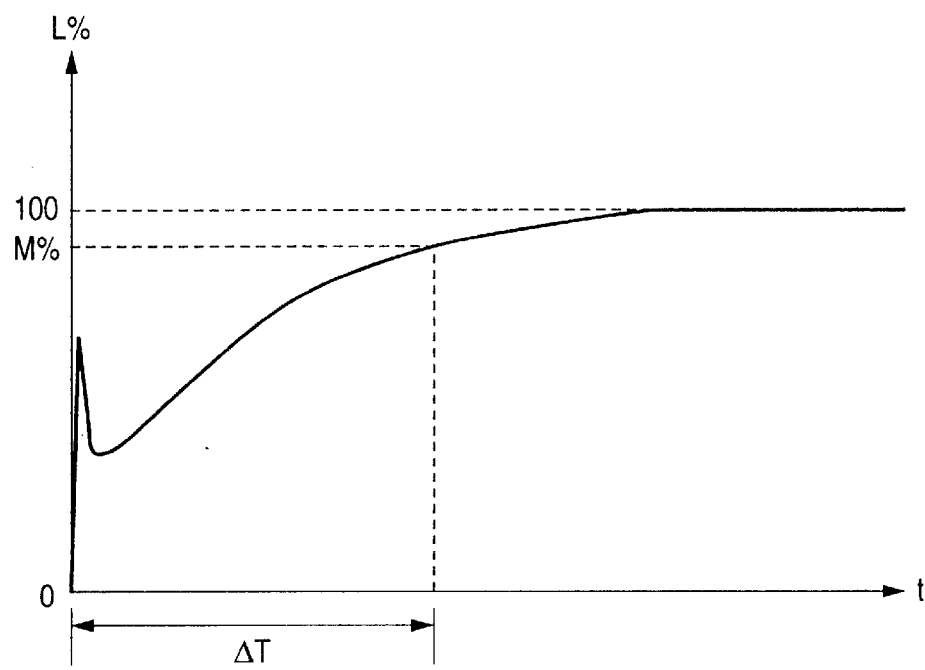
FIG. 2 shows schematically a temporal change of a luminous flux of a discharge lamp according to an implementation of the invention.

FIG. 2 shows schematically the starting time (marked with ΔT). The graph shows the temporal change of the luminous flux after the lighting start time (t=0). Time t is indicated by the abscissa and luminous flux (marked with L% and the luminous flux in the steady-state region is set as 100%.) is indicated by the ordinate. The starting time is defined as a time for the luminous flux to reach a predetermined reference value (M%) from L%=0.

Further, it is preferable that the electrical power supply be so controlled in the steady state where the both discharge lamps are switched on that the sum (P1+P2) of the values of the electrical power supplied to each discharge lamp is smaller than the sum (P12R+P12R) of the rated electrical power value of each discharge lamp. This is because the load applied on the lighting circuit can be reduced, and the power loss calculated by efficiency of the lighting circuit can be reduced. Also, it is not necessary to use an element part that is highly durable and expensive.

A device according to an implementation of the invention will be described. A lighting circuit in the device includes the following two modes.

(I) Circuit mode in which a common lighting circuit is used for a plurality of discharge lamps.

(II) Circuit mode in which an individual lighting circuit for each discharge lamp is used.

In mode (I), a common lighting circuit is provided for the discharge lamp for high beam and the discharge lamp for low beam. According to this circuit, both of the discharge lamps can be simultaneously switched on and each discharge lamp can be switched on.

In mode (II), the lighting circuit used for the discharge lamp for high beam and another lighting circuit used for the discharge lamp for low beam are provided. According to the circuit, the discharge lamps are switched on by the respective lighting circuits.

Figure 3A:
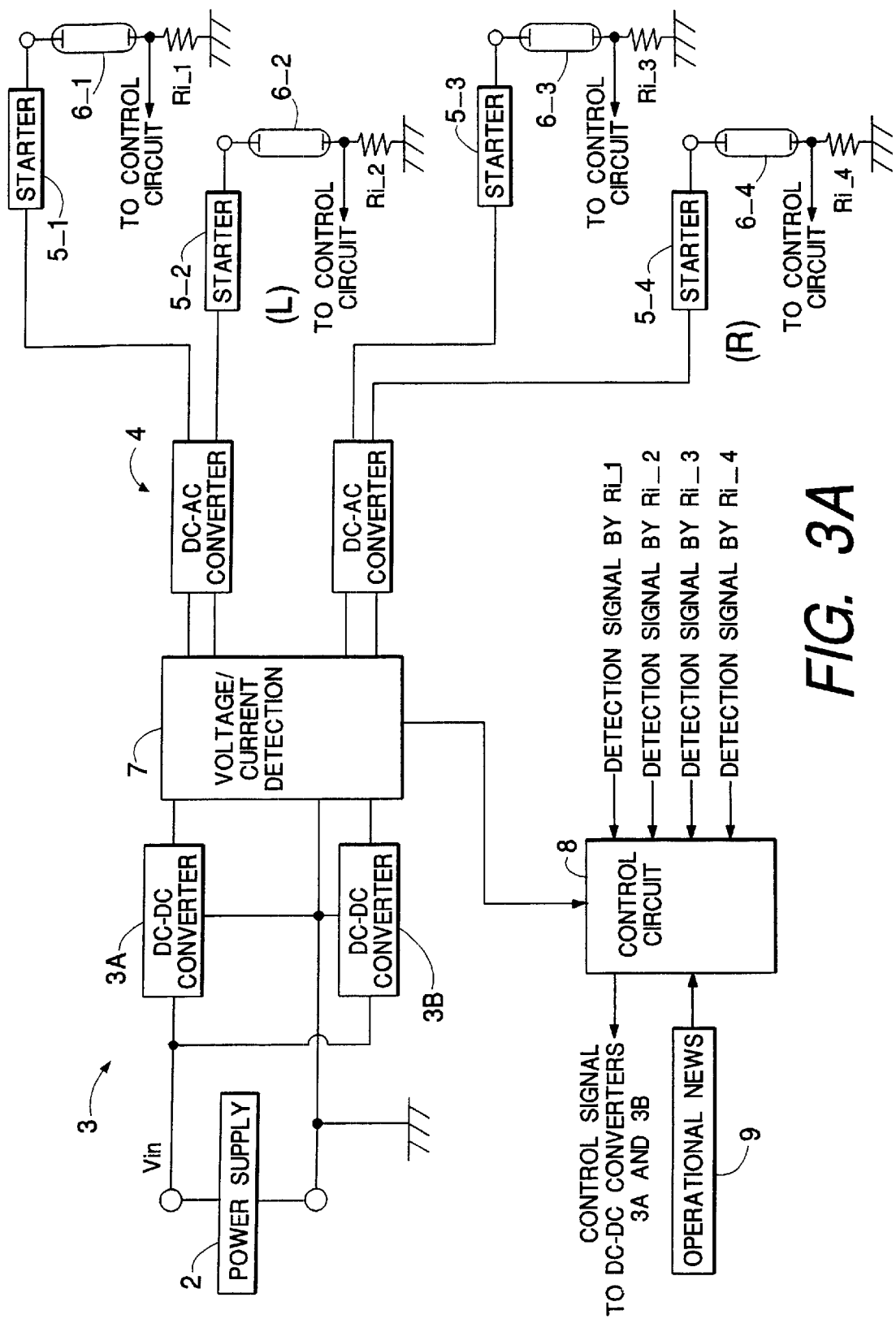
FIG. 3A is a circuit block diagram of a lighting device using two discharge lamps for high beam and two discharge lamps for low beam for a vehicle.

In terms of costs and space, mode (I) is preferable. However, for preventing a simultaneous failure of both discharge lamps when the lighting circuit breaks down, mode (II) is preferable. Therefore, it is desirable that a mode be selected in view of the various applications. Further, modes (I) and (II) are not exclusive of each other; both modes may be combined. For example, FIG. 3A illustrates a lighting device using two discharge lamps for high beam 6-1 and 6-3 and two discharge lamps for low beam 6-2 and 6-4, a lighting circuit can simultaneously switch on a first discharge lamp for low beam positioned on the left side (L) of the front of the vehicle and a first discharge lamp for high beam positioned on the right side (R) of the same, and another lighting circuit can simultaneously switch on a second discharge lamp for high beam positioned on the left side of the front of the vehicle and a second discharge lamp for low beam positioned on the right side of the same. The lighting circuit for the vehicle includes a power supply 2, DC power circuit 3, DC-AC converter 4, and a starting circuit 5 (5-1, 5-2, 5-3, 5-4). Circuit detecting means (Ri-1, Ri-2, Ri-3, Ri-4) are connected to ground and provide detection signals to the control circuit 8. If the first discharge lamp for low beam cannot be switched on for some reason, the second discharge lamp for high beam and can be switched on the substitute for the first discharge lamp for low beam.

Figure 3B:
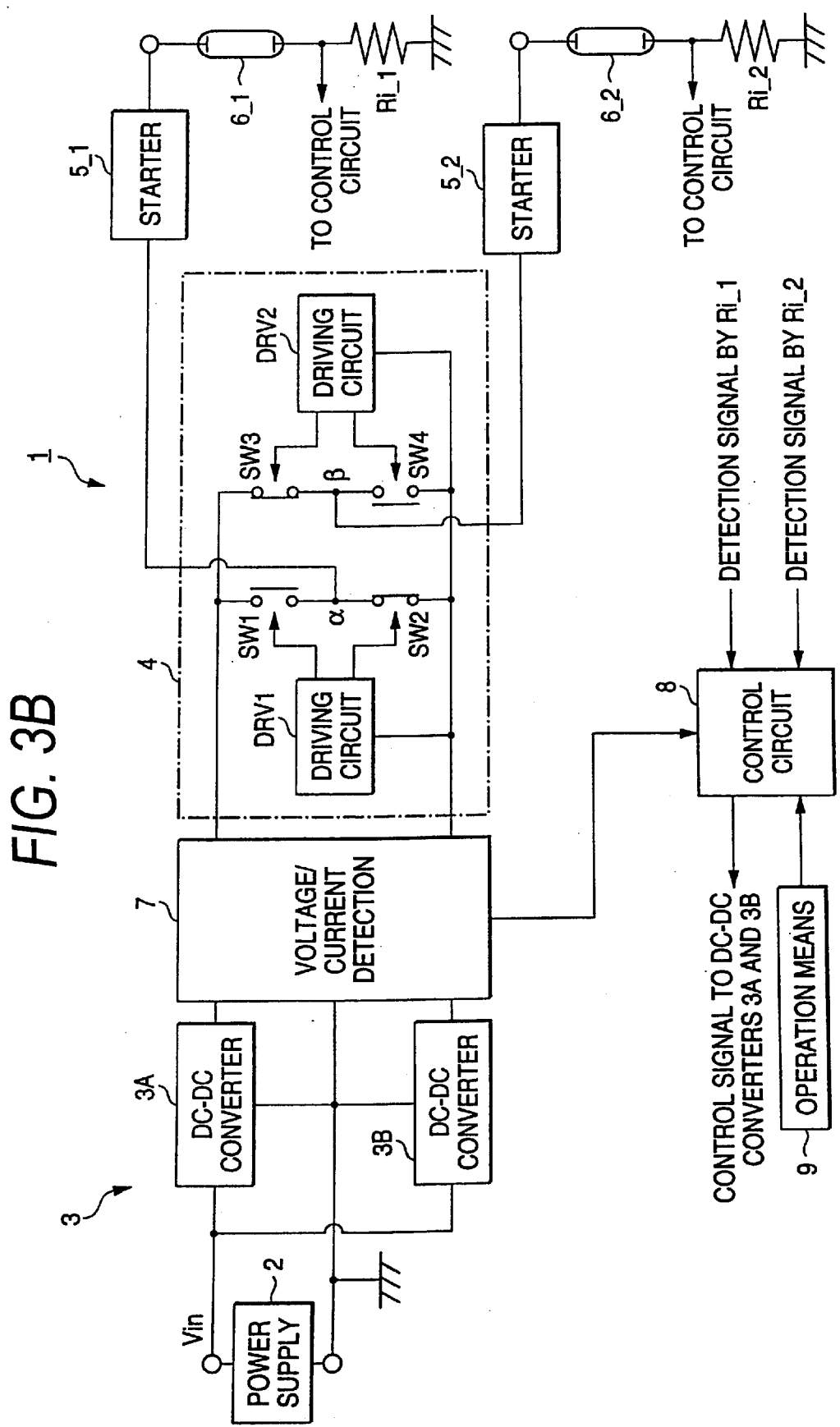
FIG. 3B is a circuit block diagram of a lighting circuit of a discharge lamp device for a vehicle according to an implementation of the invention.

FIG. 3B shows the circuit in above mode (I) comprising a lighting circuit that can simultaneously switch on the discharge lamp for high beam and the discharge lamp for low beam.

The lighting circuit in a discharge lamp device for a vehicle 1 is provided with a power supply 2 (battery or the like), a DC power circuit 3, a DC-to-AC converter 4, and a starting circuit 5 (5-1, 5-2).

The DC power circuit 3 comprises, for example, two DC-to-DC converters 3A and 3B, which are used in common by two discharge lamps 6-1 and 6-2. Further, the DC power circuit 3 receives a DC input voltage, Vin, from the power supply 2 and outputs the desired DC voltage. This output voltage can be varied and controlled according to a control signal from a control circuit described later. In the DC power circuit 3, a DC-to-DC converter having a switching regulator (chopper type, fly back type, and the like) is used, in which a first circuit portion (DC-to-DC converter 3A) for obtaining a voltage output of the positive pole (positive voltage output) and a second circuit portion (DC-to-DC converter 3B) for obtaining a voltage output of the negative pole (negative voltage output) are arranged in parallel with each other.

The DC-to-AC converter 4 is arranged in the stage sequential to the DC power circuit 3, and is provided to convert the output voltage into an AC voltage and thereafter to supply the converted output voltage to the discharge lamp. The positive voltage and the negative voltage from each output terminal of the DC power circuit 3 are fed to the DC-to-AC converter 4. The converter 4 has a full bridge type circuit comprising four switch elements sw1, sw2, sw3, and sw4, which use semi-conductive switch elements such as a field effect transistor. They are shown in the figure as switch marks.

Regarding the switch elements sw1 and sw2, which form a first set connected in series, one end of the sw1 is connected to an output terminal of the DC-to-DC converter 3A, and the other end of the switch element sw1 is connected through the switch element sw2 to an output terminal of the DC-to-DC converter 3B. The first discharge lamp 6-1 is connected through the starting circuit 5-1 (inductive load of the starting circuit) to a connection point a of the two switch elements sw1, sw2.

Further, regarding the switch elements sw3 and sw4, which form a second set connected in series, one end of the sw3 is connected to the output terminal of the DC-to-DC converter 3A, and the other end of the switch element sw3 is connected through the switch element sw4 to the output terminal of the DC-to-DC converter 3B. The second discharge lamp 6-2 is connected through the starting circuit 5-2 (inductive load of the starting circuit) to a connection point β of the two switch elements sw3, sw4.

In the stage sequential to the DC-to-AC converter 4, the respective terminals of the first and second discharge lamps, which are not connected to the above connection points α and β, are directly connected to the ground or connected through current detecting means(current detecting resistors "Ri1" and "Ri2" are shown in the figure) to the ground.

In drive circuits DRV1 and DRV2, an IC for half bridge driver is used. The drive circuit DRV1 performs on-off control of the switch elements sw1, sw2, and the other drive circuit DRV2 performs on-off control of the switch element sw3, sw4. Assuming that the state of each element sw1, sw2 is determined by the drive circuit DRV1 in one time in such a manner that the switch element sw1 is on and the switch element sw2 is off, the state of each element sw3, sw4 is determined by the drive circuit DRV2 in such a manner that the switch element sw3 is off and the switch element sw4 is on. Further, assuming that the state of each element sw1, sw2 is determined by the drive circuit DRV1 in another time in such a manner that the switch element sw1 is off and the switch element sw2 is on, the state of each element sw3, sw4 is determined by the drive circuit DRV2 in such a manner that the switch element sw3 is on and the switch element sw4 is off. The switch elements sw1, sw4 are in the same state and the switch elements sw2, sw3 are in the same state in the above manner, so that the switch elements sw1, sw4 and the switch elements sw2, sw3 operate alternately in an opposite manner to each other.

Accordingly, by the on/off operations of the two sets of switch elements, for example, while the positive voltage is supplied to the first discharge lamp 6-1, the negative voltage is supplied to the second discharge lamp 6-2. On the contrary, while the negative voltage is supplied to the first discharge lamp 6-1, the positive voltage is supplied to the second discharge lamp 6-2.

In the lighting circuit for one discharge lamp (that is, the circuit shown in FIG. 3B is, for example, a lighting circuit which switches on only the first discharge lamp 6-1), the switch elements sw1, sw2 and the-drive circuit DRV1 constitute the DC-to-AC converter, and the parts relating to the second discharge lamp 6-2 are simply and solely removed.

It is preferable in reducing the number of parts and costs that the starting circuit be used in common between the two discharge lamps 6-1,6-2 than the starting circuits 5-1, 5-2 be provided individually.

Exemplary methods of detecting the voltage and current relating to the discharge lamps 6-1, 6-2, are as follows:

(a) Method in which a bulb voltage and a bulb current are detected in a stage sequential to the DC-to-AC converter (b) Method in which signals corresponding to the bulb voltage and the bulb current are detected.

For method (a), the current detecting resistors (Ri1, Ri2) may be connected to the discharge lamps as described above to convert the current flowing into these resistors to a voltage and acquire the detection current.

Regarding method (b), a voltage/current detecting portion 7 may be arranged between the DC power circuit 3 and the DC-to-AC converter 4, as shown in FIG. 3B. The detection voltage obtained by resistance-dividing the out voltage of the DC power circuit 3 is acquired as a corresponding signal of the valve voltage. The current detecting resistor may also be arranged on a feeder to detect the output current of the DC power circuit 3, and the voltage-conversion may be preformed to acquire the detection current.

A control circuit 8 is a main circuit for controlling the power of the discharge lamp. This control is performed on the basis of a voltage detecting signal and a current detecting signal relating to the discharge lamps 6-1, 6-2; a signal showing the lighting state of each discharge lamp on the basis of these detecting signals, which is subjected to analog operation processing; or a signal of lighting instruction for each discharge lamp from an operational means 9.

This control circuit 8 has a control function for determining the supplied power values in the transient region and the steady-state region of the discharge lamp. Regarding the control of power of one discharge lamp, the control circuit and the operation of its discharge lamp will be described below.

Figure 4:
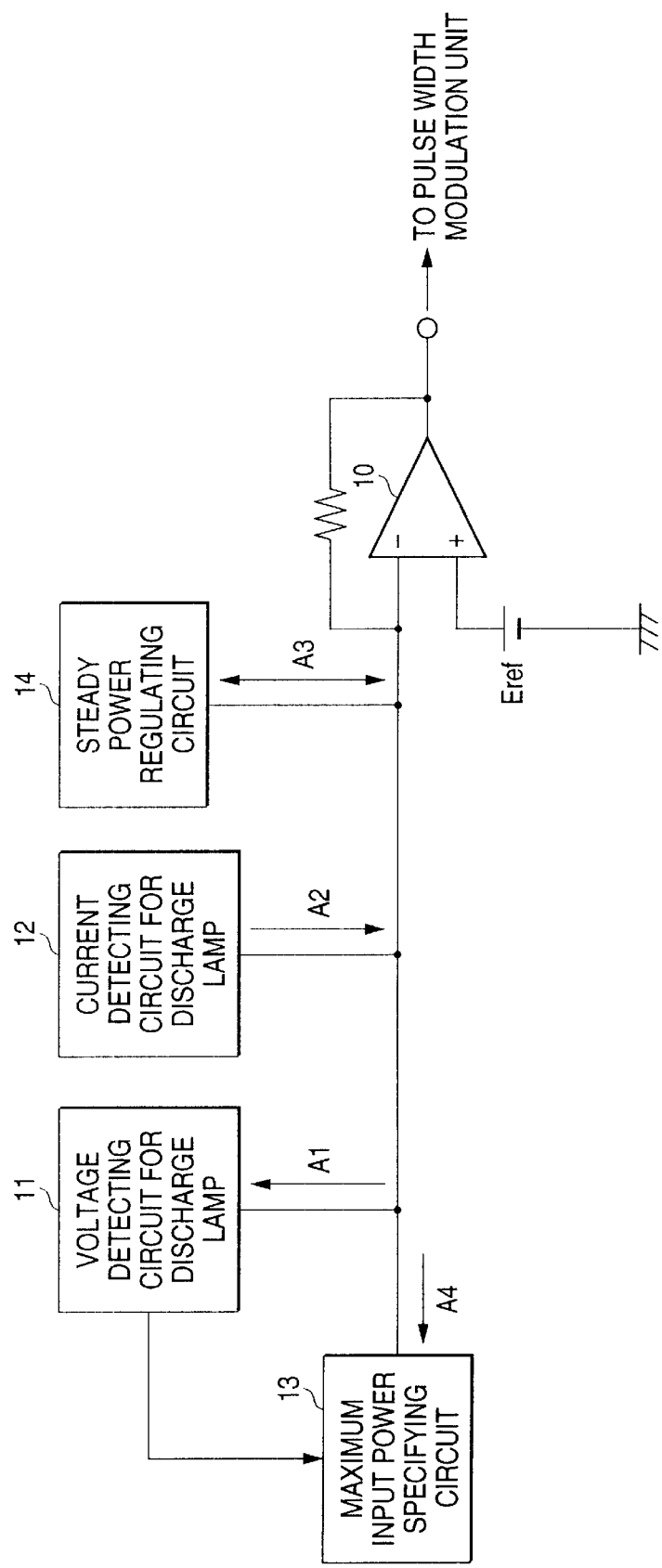
FIG. 4 is a diagram showing a portion of a control circuit for one discharge lamp according to an implementation of the invention.

FIG. 4 shows a main portion of a control circuit of PWM (pulse width modulation) control type. To a positive side input terminal of an error amplifier 10, a predetermined reference voltage "Eref"(shown with a mark of a constant voltage power supply in FIG. 4) is supplied. To a negative side input terminal thereof, the following circuits are connected (Numeral shows a sign).

a detection circuit of voltage applied to discharge lamp (11).

a detection circuit of current flowing in discharge lamp (12).

a maximum input power specifying circuit (13).

a steady power regulating circuit (14).

The maximum input power specifying circuit 13 specifies a maximum value (or the largest allowed value) of the power supplied in the transient region when the discharge lamp in cold state is lighted (the circuit 13 performs a cold start). Further, the steady power regulating circuit 14 is necessary to regulate the supplied power value under constant power control in the steady-state region. Further, since it is known that the voltage detecting circuit and the current detecting circuit can be made by using operational amplifiers (for example, refer to JP-A-4-141988), descriptions of their elements are omitted. The greater the output voltage of the error amplifier 10, the greater the power supplied to the discharge lamp becomes. The output voltage of the DC power circuit 3 is regulated in such a manner that the negative side input voltage of the error amplifier is equal to the reference voltage Eref thereof. The output voltage of the error amplifier 10 is converted into a control signal for a switching element (semi-conductive element) within the DC power circuit 3 through a PWM control portion (not shown) (a circuit portion which is composed of general-purpose IC for PWM control and the like, and generates a pulse signal in which a duty cycle changes according to the comparison result of the input voltage level and a serrate wave) and a drive circuit.

Further, arrows A1 to A4 in the FIG. 4 represent respectively the contribution to the current input to the error amplifier 10, and the direction of the control current is based on the direction of the arrow. For example, regarding the voltage detecting circuit 11 (refer to an arrow A1) and the maximum input power specifying circuit 13 (refer to an arrow A4), the directions of their control currents show a direction distant from the error amplifier 10. Therefore, the greater the value of the current flowing in this direction, the greater the power supplied to the discharge lamp becomes. On the contrary, regarding the current detecting circuit 12 (refer to an arrow A2), the direction of the control current is a direction toward the error amplifier 10. Therefore, the greater the value of the current flowing in this direction, the smaller the power supplied to the discharge lamp is. Regarding the control current in the steady power regulating circuit 14, as shown by the both arrows A3, the power regulation can be performed in any directions. If control current is regulated in the direction distant from the error amplifier 10, the supply power in the steady-state region increases (if the control current is regulated in the direction toward the error amplifier 10, the supply power in the steady-state region decreases).

In the transient region, the electrical power supplied to the discharge lamp is determined according to the lighting state of the discharge lamp by the contribution of the control currents from the voltage detecting circuit 11, the current detecting circuit 12 and the maximum input power specifying circuit 13. For example, if the voltage applied to the discharge lamp is low, a large power is sent to the discharge lamp (However, as seen from an arrow directed to the maximum input power specifying circuit 13 from the voltage detecting circuit 11, the maximum power value is determined with reference to the detection voltage). Further, the greater the current flowing in the discharge lamp, the smaller the power input to the discharge lamp becomes. To make the power input to the discharge lamp large, it is preferable to make the value of the control current shown by the arrow A4 large.

Figure 5:
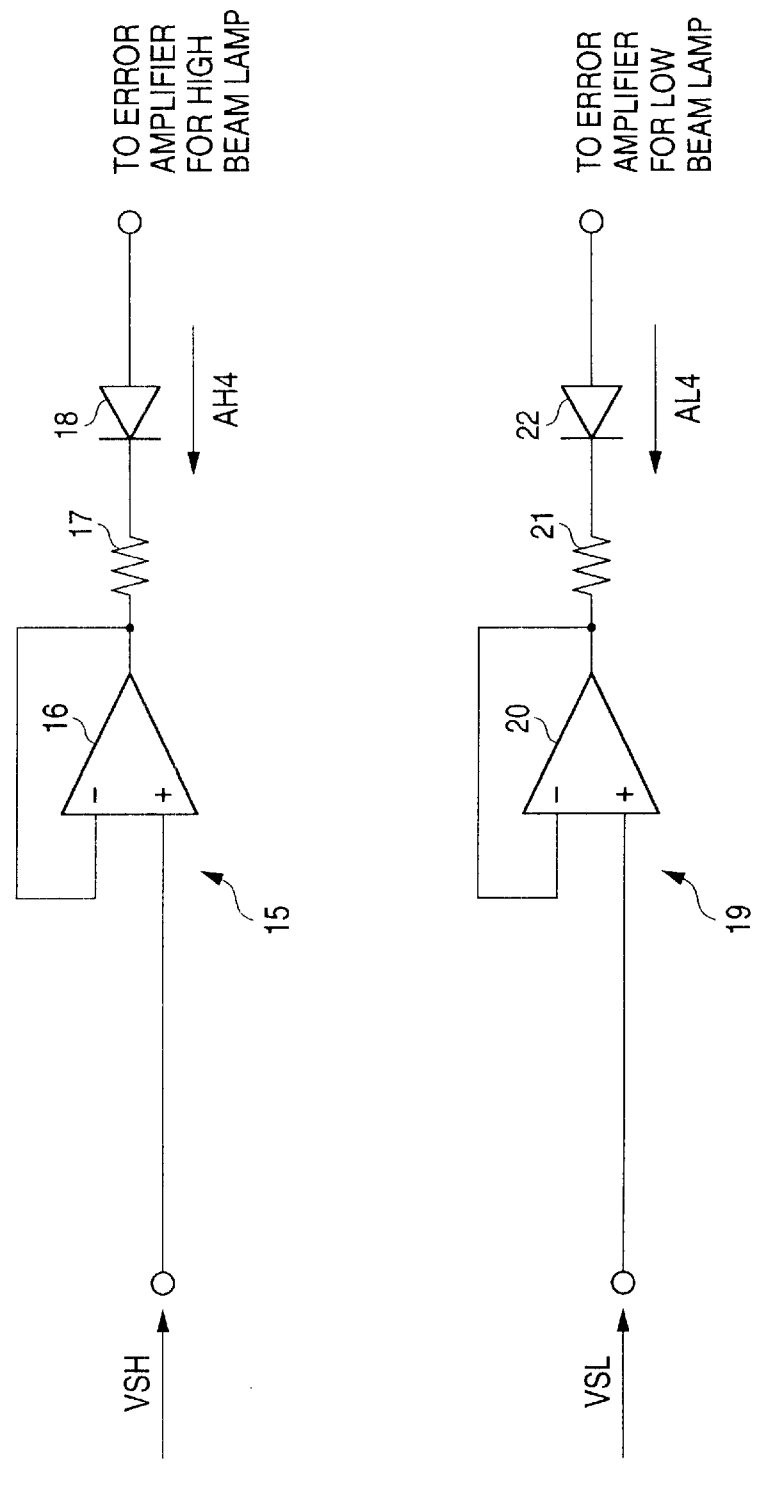
FIG. 5 is a diagram showing an output stage in a maximum input power specifying circuit according to an implementation of the invention.

FIG. 5 shows an output stage of the maximum input power specifying circuit.

Signals "VSH" and "VSL" in FIG. 5 show signals (control signals for specifying the maximum input power value are generated as a signal for controlling the current of the discharge lamp. For example, if the voltage of the discharge lamp is low in the transient region, the input power is made large, and as the voltage of the discharge lamp increases, the input power is decreased) obtained by the processing operation performed on the basis of the voltage detecting signal applied to each discharge lamp and lighting time information (the time elapsed from the lighting start time). The signal VSH relates to the discharge lamp for high beam, and the signal VSL relates to the discharge lamp for low beam.

The signal VSH is sent to a voltage buffer 15 using an operation amplifier. The signal VSH is supplied to a non-inverting input terminal of an operational amplifier 16, and an inverting input terminal is connected to an output terminal of the operational amplifier 16.

An output terminal of the voltage buffer 15 is connected through a resistor 17 to a cathode of an ideal diode 18 (circuit having ideal characteristic and special characteristic of the diode, which is composed of a real diode and an operation amplifier and shown simply with a mark of the diode in the figure). An anode of the ideal diode is connected to a negative side input terminal of an error amplifier (not shown) (which relates to power control of the discharge lamp for high beam). The control current for controlling the electrical power in the transient region flows in the direction shown by an arrow AH4 in FIG. 5.

The passage of the signal VSL is the same as that of the signal VSH. The signal VSL is supplied to a non-inverting input terminal of an operational amplifier 20 constituting a voltage buffer 19. An inverting input terminal is connected to an output terminal of the operational amplifier 20. An output terminal of the operational amplifier 20 is connected through a resistor 21 to a cathode of an ideal diode 22, and an anode of the ideal diode 18 is connected to a negative side input terminal of an error amplifier (not shown) (which relates to power control of the discharge lamp for low beam). The control current for controlling the electrical power in the transient region flows in the direction shown by an arrow AL4 in FIG. 5.

The power input to the discharge lamp for high beam in the transient region is increased by setting a resistance of the resistor 17 (that is, by making the resistances small). Similarly, the power input to the discharge lamp for low beam in the transient region is controlled by setting a resistance of the resistor 21.

It is known that the constant power control of the discharge lamp in the steady-state region is performed by satisfying a related expression V·I=W, in which V is a bulb voltage, I is a bulb current, and W is a rated power value, or by satisfying a related expression V+I=W, which is obtained from linear approximation. To provide a higher accurate approximation, it is preferable that the constitution of the voltage detecting circuit or the current detecting circuit be complicated so that the approximation is made in relation to the constant power curve by using many liner approximations, which requires consideration of demerits accompanied with the greater number of parts.

Since it is expected that there be no control current from the maximum input power specifying circuit 13 in the steady-state region, the total of the control currents from the voltage detecting circuit 11, the current detecting circuit 12, and the steady power regulating circuit 14 is controlled so as to be zero ampere. That is, in this state, the balance between the input voltage and the reference voltage is kept in the error amplifier. However, if this balance is lost, for example, if the input voltage becomes low, the output voltage of the amplifier increases to increase the supplied power. On the contrary, if the input voltage becomes high, the output voltage of the amplifier decreases to decrease the supplied power.

In the example shown in FIG. 5, the control outputs are obtained in relation to the error amplifier of each discharge lamp. However, in a mode in which the total power supplied to the two discharge lamps is controlled by the output of one error amplifier, the constitution shown in FIG. 4 must be changed as follows:

(1) Replace the above voltage detecting circuit 11 with a voltage detecting circuit for detecting the total value of the voltages applied to the two discharge lamps.

(2) Replace the above current detecting circuit 12 with a current detecting circuit for detecting the total value of the currents flowing in the two discharge lamps.

(3) Determine the total value of the power input to the two discharge lamps at the lighting time by the maximum input power specifying circuit 13 or the steady power regulating circuit 14, and regulate the power input to the discharge lamp for high beam in the transient region so as to be greater than the power input to the discharge lamp for low beam by setting the constants (resistance, capacitance, and others) of the circuit elements as described above.

From the above explanation, the power input to the discharge lamp in the transient region can be freely set to some degree. If the input power is too large, the life of the discharge lamp may be shortened and the circuit element may generate heat. If the input power is too small, a reduction of starting time cannot be achieved. Therefore, the limit of setting range is determined. In terms of the life of the discharge lamp, it is preferable to perform the control only under a "certain state" requiring this power control than always performing such power control.

The certain state refers to following states:

When the on/off instruction signal to the discharge lamp for high beam is detected.

When the discharge lamp for high beam must be momentarily switched on as a substitutive light source for the discharge lamp for low beam.

The detection of the on/off instruction signal can be determined by detecting the lengths of the on-period and the off-period of the signal given to the discharge lamp for high beam at the on/off signaling (passing) operations. When a driver of a vehicle repeats the on/off instruction of the discharge lamp at one cycle or more by using the operational means 9 for giving on/off instructions (which includes an operational member such as an operational arm provided in the vicinity of a handle, a detecting element such as a switch cooperating with its operation, and a circuit), if the detection signal is arranged to be switched between two levels according to the instructions, and the signal satisfies the following conditions (A), (B), it is deteremined that the on/off instructions are given to the discharge lamp for high beam.

(A) The length of the on-period of the detection signal is above a first value (marked with Ti) and below a second value (marked with T2).

(B) The length of the off-period of the detection signal is above a third value (marked with T3) and below a fourth value (marked with T4).

Figure 6:
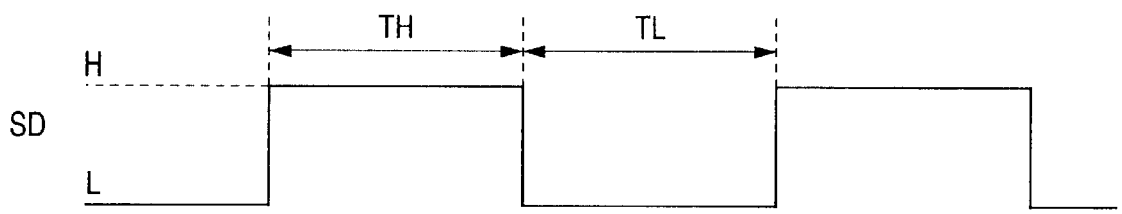
FIG. 6 is a diagram showing an on-period and an off-period of an on/off instruction signal given to a discharge lamp according to an implementation of the invention.

FIG. 6 shows a waveform of the detection signal (first detection signal) "SD" obtained by the operational means 9 for giving the on/off instructions. A period "TH" represents the on-period (shown as a H level period in the figure), and a period "TL" represents the off-period (shown as a L level period in the figure). Here, H and L marked on those periods mean the height of the signal level and not the high and low beam.

Figure 7:
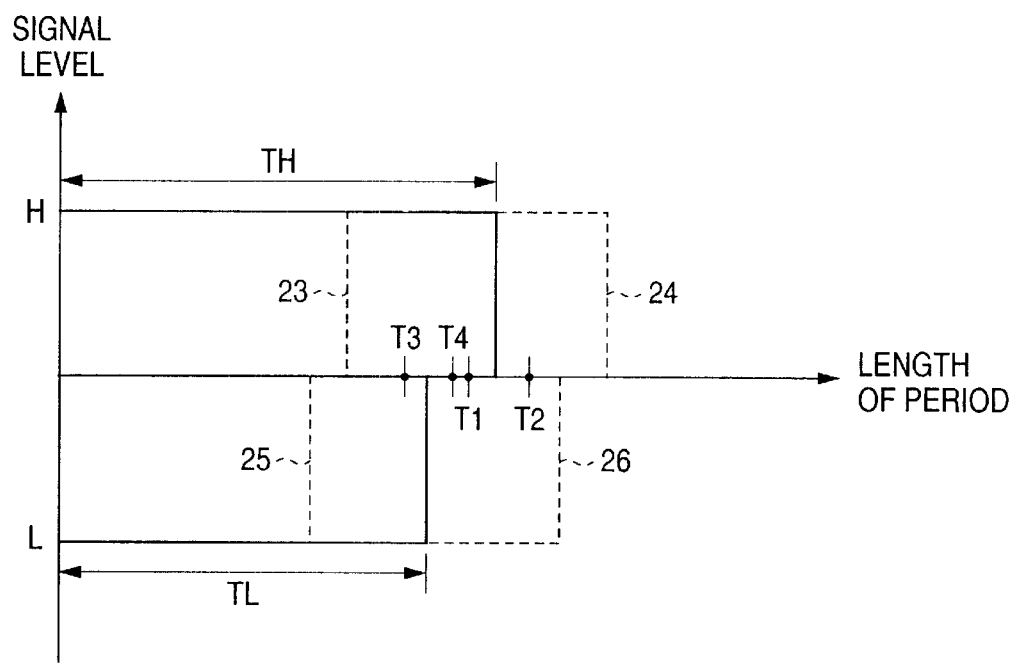
FIG. 7 shows a state of an on/off instruction signal according to an implementation of the invention.

FIG. 7 shows conceptually a binary state of the detection signal SD, in which a length of the period is indicated by the abscissa and the signal level is indicated by the ordinate. All values T1 to T4 shown on the abscissa are different values for convenience of explanation.

In the above (A) condition, that is, T1 TH T2, the lowest limit value T1 is set to eliminate the influence of the error detection because of noise and the like. For example, as shown by a broken line 23 in FIG. 7, if the length of TH is smaller than T1, the case is regarded as noise and ignored. If the value of T1 is too small, a probability that a wrong lighting instruction will be given by the noise may increase. Also, chances of accidental contact of the operational arm may increase.

Further, the highest limit value T2 is set to distinguish the on-off instruction of the discharge lamp from the lighting state over a long time. As shown by a broken line 24 in FIG. 7, if the length of TH is longer than T2, it is determined that not the on-off instruction but the continuous lighting instruction is given to the discharge lamp. Accordingly, the longer this value is, the harder it is to distinguish between the two instructions.

In the above (B) condition, that is, T3≦TL≦T4, the lowest limit value T3 is set to eliminate the influence of the error detection because of noise and the like. For example, as shown by a broken line 25 in FIG. 7, if the length of TL is shorter than T3, this case is regarded as noise and ignored. If the value of T3 is too small, a probability of the error detection because of noise may rise.

Further, the highest limit value T4 is set to distinguish the on-off instruction of the discharge lamp from the light-out state over a long time. As shown by a broken line 26 in FIG. 7, if the length of TL is larger than T4, it is determined that not the on-off instruction but the continuous lights-out instruction is given to the discharge lamp. Accordingly, the longer this value is, the harder it is to distinguish between the two instructions.

The determination of those conditions above can be made once within one cycle including the periods TH and TL. Alternatively, it can be made some times within two cycles or more. The latter is preferable from the viewpoint of the reduction of the error detection. However, since a large number of determinations requires a lot of times for the last decision, it is desirable that the determination be performed with the number of determinations as small as possible.

Figure 8:
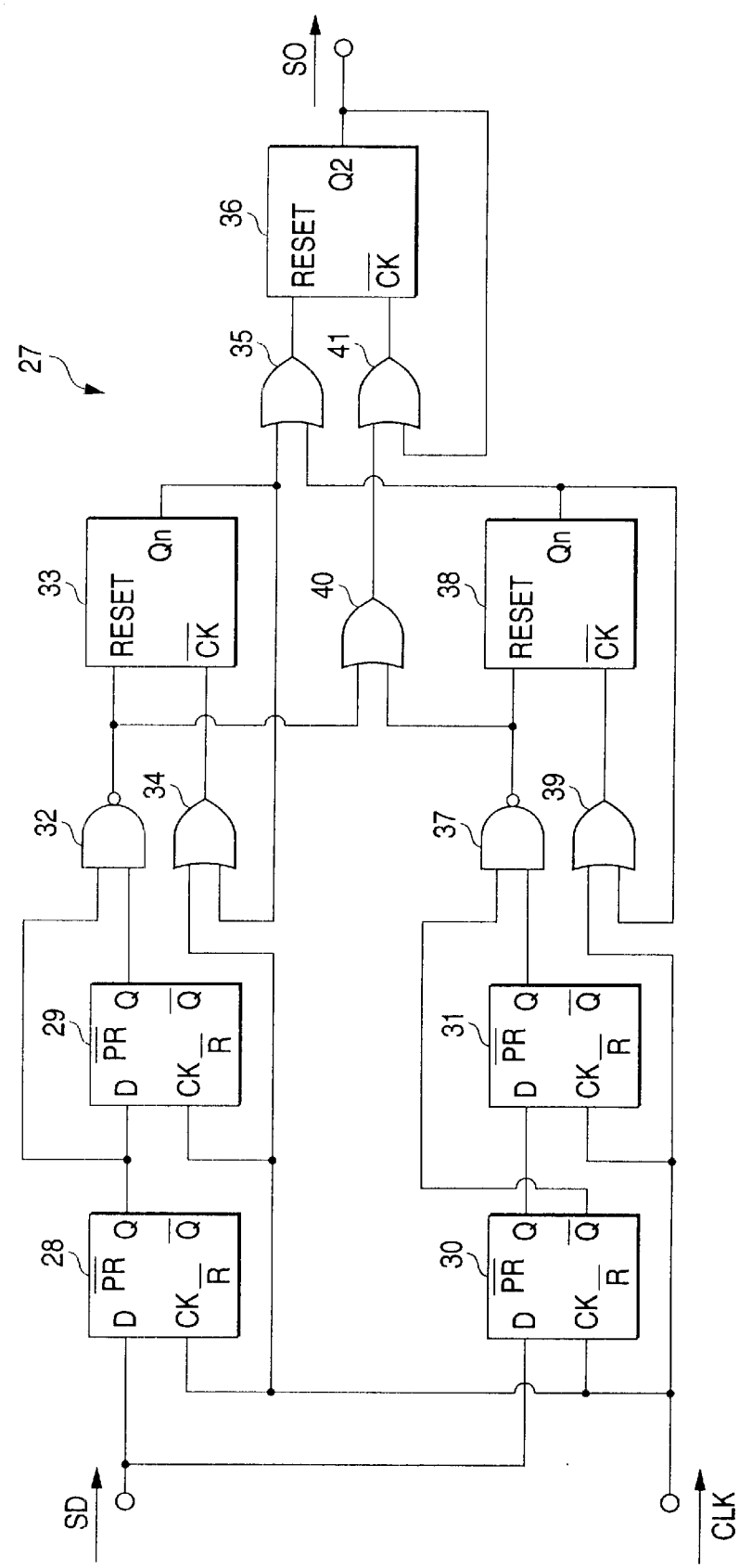
FIG. 8 shows a detection circuit relating to an on/off instruction signal given to a discharge lamp according to an implementation of the invention.

FIG. 8 shows an exemplary detection circuit 27, which is composed of a digital logic circuit. A phase of a detection signal SD is defined such that an H level period indicates the lighting instruction to the discharge lamp for high beam and an L level period indicates the lights-out instruction to the discharge lamp for high beam. Detection signals SD are respectively supplied to two D flip-flops 28,29 shown in the upper row of the figure, and two D flip-flops 30,31 shown in the lower row of the figure. Regarding the D flip-flops 28, 29, the detection signal SD is supplied to a D input terminal of the former D flip-flop 28, and a clock signal (CLK) from a clock signal generating circuit (not shown) is supplied to a clock signal input terminal (CK) of the same. Then, Q output of the D flip-flop 28 is sent to a D input terminal of the latter D flip-flop 29 and further sent to one input terminal of a bi-input NAND (NOT AND) gate 32. The clock signal CLK is supplied to a clock signal input terminal (CK) of the D flip-flop 29, and Q output thereof is sent to the other input terminal of the bi-input NAND gate 32. Then, an output signal of the bi-input NAND gage 32 is sent to a reset terminal (Reset) of a counter 33 sequent to the gate 32. To a clock input terminal (a bar symbol (-) on CK in the figure) of the counter 33, the clock signal CLK and a signal obtained from an output terminal (Qn) of the counter 33 are supplied through a bi-input OR gate 34. Qn output of the counter 33 is sent to one input terminal of a bi-input OR gate 35, and an output signal of the gate 35 is supplied to a reset terminal (Reset) of a counter 36 in the last stage. And, to the other input terminal of the bi-input OR gate 35, an output signal of a counter (38) in the lower row, which will be describe later, is supplied.

Regarding the D flip-flops 30, 31, the detection signal SD is supplied to a D input terminal of the former D flip-flop 30, and the clock signal CLK is supplied to a clock signal input terminal (CK) of the same. Then, Q output of the D flip-flop 30 is sent to a D input terminal of the latter D flip-flop 31, and Q bar output (a bar symbol (-) on Q in the figure) is sent to one input terminal of a bi-input NAND gate 37. The clock signal CLK is supplied to a clock signal input terminal (CK) of the D flip-flop 31, and Q bar output (a bar symbol (-) on Q in the figure) thereof is sent to the other input terminal of the bi-input NAND gate 37. Then, an output signal of the bi-input NAND gage 37 is sent to a reset terminal (Reset) of a counter 38 sequent to the gate 37. To a clock input terminal (a bar symbol (-) on CK in the figure) of the counter 38, the clock signal CLK and a signal obtained from an output terminal (Qn) of the counter 38 are supplied through a bi-input OR gate 39.

An output signal of the counter 38 is supplied to the other input terminal of the above bi-input OR gate 35, and a signal obtained as OR by this signal and the output signal of the counter 38 becomes a reset signal to the counter 36 in the last stage.

Further, the output signals of the NAND gates 32 and 37 are sent to a bi-input OR gate 40, and an output signal of the gate 40 is sent to one input terminal of a bi-input OR gate 41. To the other input terminal of the bi-input OR gate 41, an output signal from an output terminal (Q2) of the counter 36 is supplied, and an output terminal of the gate 41 is connected to a clock input terminal (a bar symbol (-) on CK) in the figure) of the counter 36.

An output signal (SO) from the output terminal (Q2) of the counter 36 represents the decision result in this circuit. If a level of this signal is H level, it is determined that the on/off instruction is given to the discharge lamp, and if its level is L, it is determined that the on/off instruction is not given to the discharge lamp.

The outputs Qn and Q2 of the above counters represent the step number (or step rank), that is, Qn represents the n-th output, and Q2 represents the second output.

In the circuit shown in FIG. 8, the above first value T1 is determined by the D flip-flops 28, 29. The output of the NAND gate 32 does not enters the L level until the H level state of the input signal SD continues for two clocks. And, the above second value T2 is determined by the output of the counter 33 sequent to the gate 32. If the length of the on-period TH of the signal SD is T2 or more, the output Qn becomes the H level signal, whereby the counter 36 in the last stage is reset and then the L level signal (SO=L) is output from the output terminal Q2. Further, if the length of the on-period TH of the signal SD is within T2, before the output of the NAND gate 32 becomes the H level signal and the output Qn of the counter 33 enters the H level, the counter 33 is reset. Therefore, a count-up operation by the counter 36 in the last stage is performed.

On the other hand, the above third value T3 is determined by the D flip-flops 30, 31, and the output of the NAND gate 37 does not enter the L level until the L level state of the input signal SD continues for two clocks. And the above fourth value T4 is determined by the output of the counter 38 sequent to the gate 37. If the length of the off-period TL of the signal SD is T4 or more, the output Qn becomes the H level signal, whereby the counter 36 in the last stage is reset and then the L level signal (SO=L) is output from the output terminal Q2. Further, If the length of the off-period TL of the signal SD is within T4, before the output of the NAND gate 37 becomes the H level signal and the output Qn of the counter 38 enters the H level, the counter 38 is reset. Therefore, the count-up operation by the counter 36 in the last step is performed.

To the counter 36 in the last stage, the OR output of the NAND gates 32, 37 is supplied as a clock signal. As long as the output signal of the OR gate 35 is the L level signal, the count-up operation is performed, and the H level signal (SO=H) is sent out from the output terminal Q2 of the counter 36 at the completion time of the operation.

To reflect the thus obtained signal SO in the aforesaid power control, the input power in the transient region of the discharge lamp is simply and solely controlled by using this signal. For example, as shown in FIG. 9, the constitution shown in FIG. 5 is only changed slightly.

Figure 9:
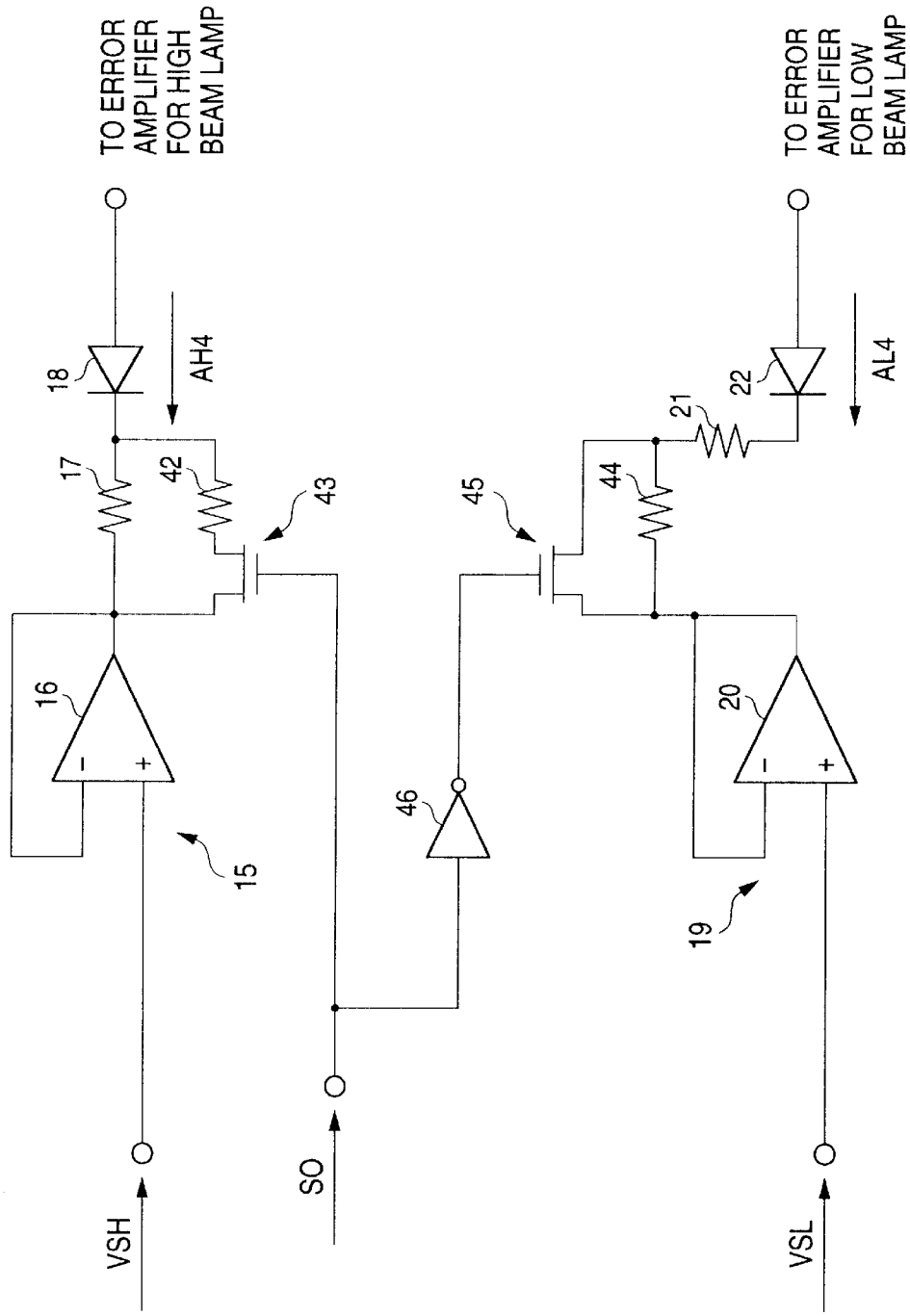
FIG. 9 shows a portion of a control circuit when an on/off instruction signal given to a discharge lamp is detected according to an implementation of the invention.

In FIG. 9, a serial circuit (which is shown by a simplified mark and composed of, for example, FET) comprising a resistor 42 and an analog switch 43 is connected in parallel to the resistor 17 connected to the output terminal of the voltage buffer 15 relating to the power control of the discharge lamp for high beam. If the signal SO is the H level signal, since, the analog switch 43 is switched on and these resistors 17 and 42 are connected in parallel, the resistance synthesized from the values of the resistors 17 and 42 is smaller than the resistance of the resistor 17.

In the output stage of the voltage buffer 19 relating to the power control of the discharge lamp for low beam, a resistor 44 is connected in series to the resistor 21 connected to the cathode of the real diode 22 (that is, the resistor 44 is interposed between the output terminal of the operational amplifier 20 and the resistor 21). An analog switch 45 is connected in parallel to the resistor 44. And, to the analog switch 45, the signal SO is supplied through a NOT gate 46. If the signal SO is the H level signal, the analog switch 45 enters the off-state and the resistors 21 and 44 are connected in series. Therefore, the resistance synthesized from the values of the resistors 21 and 44 is greater than the resistance of the resistor 21.

However, the smaller the resistance of the resistor interposed between the ideal diode (18, 22) and the voltage buffer (15, 19) is, the greater the power input to the discharge lamp becomes. Therefore, when the signal SO is the H level signal, that is, when the on/off instruction signal to the discharge lamp for high beam is detected by the above detecting circuit 27, the resistors 17 and 42 are connected in parallel and the synthesized resistance becomes smaller, so that the power input to the discharge lamp for high beam increases. On the other hand, regarding the discharge lamp for low beam, the resistors 21 and 44 are connected in series and the synthesized resistance becomes greater, so that the power input to the discharge lamp for low beam decreases. The power supply control is so performed that the input power for lighting the discharge lamp for high beam is greater than the input power for lighting the discharge lamp for low beam.

Further, when the signal SO is the L level signal, that is, when the on/off instruction signal to the discharge lamp for high beam is not detected by the above detecting circuit 27, since the resistor 42 is not connected to the resistor 17 in parallel, the power input to the discharge lamp for high beam is specified by the current flowing in the resistor 17. And, the analog switch 45 is switched on and bypass in relation to the resistor 44 is formed. Therefore, the power input to the discharge lamp for low beam is specified by the current flowing in the resistor 21.

In this example, when the on/off instruction given to the discharge lamp for high beam is detected, the power input to this discharge lamp is increased and the power input to the discharge lamp for low beam is decreased. If the power input to the discharge lamp for high beam is increased, the resistor 44, the analog switch 45, and the NOT gate 46 are of course not required.

If the discharge lamp for low beam cannot be lighted due to some reasons, a case in which the discharge lamp for high beam is momentarily lighted as a substitutive light source for the discharge lamp for low beam will be described.

To detect that the discharge lamp for low beam is not switched on through the lighting instruction is given to this discharge lamp, there are several modes. For example, a light detecting means for detecting a light emitted from the discharge lamp is provided thereby to determine the non-lighting state from that the light receiving amount is below threshold, or a current detecting means for detecting the current flowing in the discharge lamp is provided thereby to determine the non-lighting state from that the detection current is below the threshold.

If the discharge lamp for low beam is not switched on, the instruction signal for lighting the discharge lamp for high beam is generated to be substituted. At this time, the control for increasing the power input to the discharge lamp for high beam is performed. For example, in the circuit shown in FIG. 9, the signal SO is replaced with the instruction signal for substitutively lighting the discharge lamp for high beam, and if this instruction signal is the H level signal, the analog switch 43 is switched on and the resistors 17 and 42 are connected in parallel. Hereby, since the starting time can be reduced if the discharge lamp for high beam is lighted as a substitution for the discharge lamp for low beam, it is possible to shorten the time for which driver's field of vision worsens temporally.

According to the first implementation of the invention, the power control of the discharge lamp for high beam is so performed that the power input when the discharge lamp for high beam is lighted is greater the power input when the discharge lamp for low beam is lighted, whereby the luminous flux of the discharge lamp for high beam can be momentarily raised and the necessary illuminating light quantity can be obtained quickly.

According to the second implementation of the invention, when the on/off instruction signal given to the discharge lamp for high beam is detected, the power input to its discharge lamp is temporally increased; and if its discharge lamp is continuously lighted, the power supplied to the discharge lamp is controlled without performing the intentional increase of the input power as described above, whereby it is possible to prevent the life of the discharge lamp from shortening and heat generation of the circuit element can be reduced.

According to the third implementation of the invention, the frequency of occurrence of the error detection on the on/off instruction given to the discharge lamp for high beam is reduced, whereby reliability of the control can be improved. Several implementations of the invention have been described herein, but it should be understood that various additions and modifications could be made which fall within the scope of the following claims.

What is claimed is:

1. A discharge lamp device for a vehicle comprising:
   at least two discharge lamps having the same electrical power rating; and
   a lighting circuit for controlling the discharge lamps;
   wherein, in lighting the discharge lamps, the lighting circuit is configured to provide one discharge lamp with a greater electrical power than another discharge lamp, wherein the discharge lamps are supplied initially with an electrical power greater than the rated electrical power to reach a steady-state intensity rapidly.

2. The discharge lamp device of claim 1 wherein after the discharge lamps reach the steady-state intensity, the sum of power supplied to each discharge lamp is arranged to be less than the sum of the rated power of each discharge lamp.

3. The discharge lamp device of the claim 1 comprising four discharge lamps, a first pair of discharge lamps located on the right, front side of the vehicle and a second pair of discharge lamps on the left, front side of the vehicle, and each pair comprising a discharge lamp for high beam and a discharge lamp for low beam.

4. The discharge lamp device of claim 3, wherein the lighting circuit controls the first pair of the discharge lamps and the second pair of the discharge lamps commonly.

5. The discharge lamp device of claim 3, comprising a first lighting circuit and a second lighting circuit, the first lighting circuit controlling the discharge lamp for high beam of the first pair and the discharge lamp for low beam of the second pair; and the second lighting circuit controlling the discharge lamp for high beam of the second pair and the discharge lamp for low beam of the first pair.

6. The discharge lamp device of claim 1 wherein the discharge lamp supplied with the greater power is used for high beam and the discharge lamp supplied with a lower power is used for low beam.

7. The discharge lamp device of claim 6 wherein the lighting circuit controls the discharge lamp for high beam and the discharge lamp for low beam commonly.

8. The discharge lamp device for a vehicle of claim 6 wherein a signal detected by the discharge lamp for high beam is an on-and-off instruction if the signal has an on-period ending between a first value and a second value and has an off-period ending between a third value and a fourth value.

9. The discharge lamp device for a vehicle of claim 8, wherein if the on-and-off instruction is detected by the discharge lamp for high beam, an electrical power supplied to the discharge lamp for high beam is made greater than an electrical power supplied to the discharge lamp for low beam.

10. A discharge lamp device for a vehicle comprising:
    a discharge lamp for high beam;
    a discharge lamp for low beam, which have the same rating as each other, and
    a lighting circuit for performing lighting control of these lamps,
    wherein electrical power supply is so controlled that electrical power input when the above discharge lamp for high beam is lighted is greater than electrical power input when the above discharge lamp for low beam is lighted, wherein the discharge lamps are supplied initially with an electrical power greater than the rated electrical power to reach a steady-state intensity rapidly.

11. The discharge lamp device of claim 10, wherein when a signal, of which a range of on-period is between a first value and a second value and of which a range of off-period is between a third value and a fourth value, is detected by the discharge lamp for high beam, the signal is determined to be an on/off instruction for discharge lamp for the high beam.

12. The discharge lamp device of claim 11, wherein when the on-and-off instruction signal given to the discharge lamp for high beam is detected, an electrical power input when the above discharge lamp is lighted is greater than electrical power input when the discharge lamp for low beam is lighted.

13. A discharge lamp device for a vehicle comprising:
    a first discharge lamp;
    a second discharge lamp;
    a lighting circuit for controlling the first discharge lamp and the second discharge lamp;
    wherein, in lighting the first and the second discharge lamps, the lighting circuit is configured to provide the first discharge lamp with a greater electrical power than the second discharge lamp, wherein the discharge lamps are supplied initially with an electrical power greater than the rated electrical power to reach a steady-state intensity rapidly.

14. The discharge lamp device according to claim 13 wherein the lighting circuit comprises:
    a DC power circuit;
    a DC-to-AC converter coupled to the DC power circuit, the DC-to-AC converter having four switch elements;
    a first starting circuit coupled to the DC-to-AC converter and to the first discharge lamp;
    a second starting circuit coupled to the DC-to-AC converter and to the second discharge lamp; and
    a control circuit coupled to the DC power circuit and to the first and second discharge lamps to control the power supplied to the first and second discharge lamps.

15. The discharge lamp device according to claim 13 wherein the lighting circuit comprises:
    a first DC-to-DC converter;
    a second DC-to-DC converter;
    a voltage and current detector coupled to the first and the second-DC-to-DC converters;
    a DC-to-AC converter coupled to the first and second DC-to-DC converters, the DC-to-AC converter having first, second, third, and fourth switch elements;
    a first starting circuit coupled to the DC-to-AC converter and to the first discharge lamp;
    a second starting circuit coupled to the DC-to-AC converter and to the second discharge lamp; and
    a control circuit coupled to the DC power circuit and to the first and second discharge lamps to control the power supplied to the first and second discharge lamps;

wherein one end of the first switch element is coupled to the first DC-to-DC converter and the other end is coupled to the second DC-to-DC converter through the second switch element; one end of the third switch element is coupled to the first DC-to-DC converter and the other end is coupled to the second DC-to-DC converter through the fourth switch; and the first and fourth switch elements operate in the same state and the second and the third switch elements operate in the same state such that first and fourth switch elements operate alternately in an opposite manner with the second and third switch elements.

16. The discharge lamp device according to claim 13, wherein the lighting circuit comprises:
   a DC power circuit;
   a DC-to-AC converter coupled to the DC power circuit, the DC-to-AC converter having four switch elements;
   a first starting circuit coupled to the DC-to-AC converter and to the first discharge lamp;
   a second starting circuit coupled to the DC-to-AC converter and to the second discharge lamp; and
   a control circuit coupled to the DC power circuit and to the first and second discharge lamps to control the power supplied to the first and second discharge lamps, the control circuit comprising:
   an amplifier having first and second input terminals, the first input terminal being supplied with a reference voltage;
   a current detector coupled to the second input terminal for detecting current in each discharge lamp;
   a voltage detector coupled to the second input terminal for detecting voltage in each discharge lamp;
   a maximum power circuit coupled to the second input terminal for specifying a maximum power supplied to each discharge lamp during its initial lighting period; and
   a steady power regulating circuit coupled to the second input terminal for regulating the power supplied to each discharge lamp during its steady state lighting period.

17. The discharge lamp device according to claim 16 wherein the maximum power circuit comprises:
   a first voltage buffer for generating a signal that controls the power in the first discharge lamp; and
   a second voltage buffer for generating a signal that controls the power in the second discharge lamp.

18. The discharge lamp device according to claim 13 wherein the lighting circuit comprises:
   a control circuit coupled to the first and second discharge lamps for controlling the power supplied to the first and second discharge lamps; and
   an operation device coupled to the control circuit for sending an on-off instruction signal for high beam to the control circuit.

19. The discharge lamp device according to claim 18 wherein the operation device comprises:
   a circuit for detecting a signal of which a range of on-period is between a first value and a second value and of which a range of off-period is between a third vale and a fourth value.

20. The discharge lamp device according to claim 18 wherein the control circuit comprises:
   a first voltage buffer for generating a signal that controls the maximum power in the first discharge lamp; and
   a second voltage buffer for generating a signal that controls the maximum power in the second discharge lamp;
   wherein the first voltage buffer includes a first switch that switches on when the on-off instruction signal for high beam is detected to provide more power to the first discharge lamp; and the second voltage buffer includes a second switch that switches off when the on-off instruction signal for high beam is detected to provide less power to the second discharge lamp.

* * * * *